Nov. 25, 1924.

B. D. CLEMENT

CREAM TESTING TANK

Filed Dec. 8, 1923

1,517,194

WITNESSES
H. T. Walker
A. L. Kitchin

INVENTOR
B. D. CLEMENT
BY
ATTORNEYS

Patented Nov. 25, 1924.

1,517,194

UNITED STATES PATENT OFFICE.

BRUCE DUANE CLEMENT, OF AMARILLO, TEXAS.

CREAM-TESTING TANK.

Application filed December 8, 1923. Serial No. 679,443.

*To all whom it may concern:*

Be it known that I, BRUCE D. CLEMENT, a citizen of the United States, and a resident of Amarillo, in the county of Potter and State of Texas, have invented a new and Improved Cream-Testing Tank, of which the following is a full, clear, and exact description.

This invention relates to a cream testing tank and has for an object to provide an improved construction wherein means are provided for raising and maintaining the cream at the proper temperature for testing purposes.

Another object of the invention is to provide a tank for use in testing cream wherein a plurality of compartments are provided having liquids of different temperatures therein for providing in a single receptacle means for maintaining cream at different temperatures according to the test desired.

In the accompanying drawing—

Figure 1:
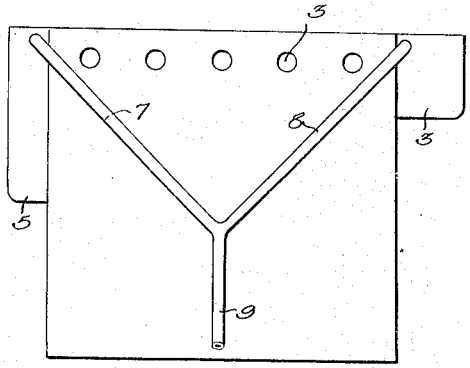
Figure 1 is a side view of a testing tank, disclosing an embodiment of the invention.
Figure 2:
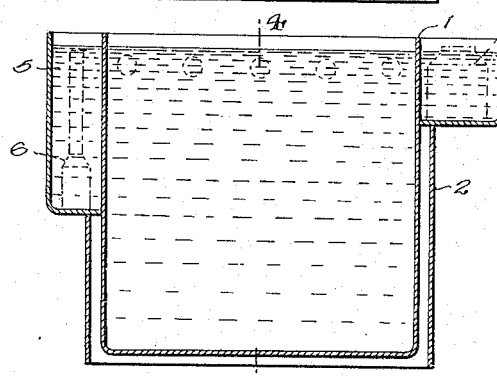
Figure 2 is a longitudinal vertical sectional view through the tank shown in Figure 1.
Figure 3:
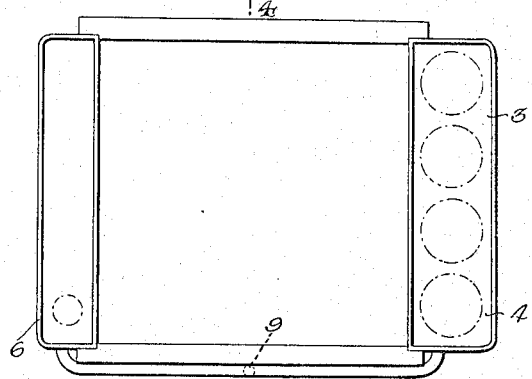
Figure 3 is a top plan view of the structure shown in Figure 1.
Figure 4:
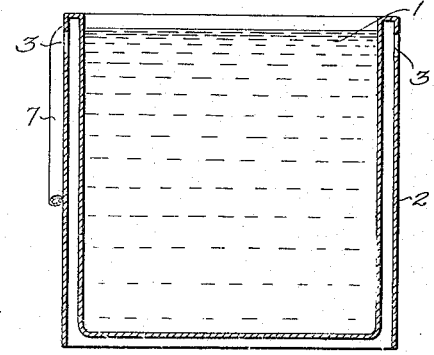
Figure 4 is a sectional view through Figure 2, approximately on line 4—4.

In testing cream, it is necessary to have the cream at a certain temperature and to treat the same in a certain specified manner in order to secure the desired result. In testing a given quantity of cream, it is preferable to place in warm water the sample jars containing the cream and heat the water until the cream reaches a temperature of 110° F. This heat causes the cream to become a liquid and the fat globules can then be more thoroughly mixed. The temperature should not be allowed to exceed 110° F. or the fat will become liquefied and rise to the top which would make accurate sampling difficult. After the cream has been properly heated, it is thoroughly mixed, which may be done by stirring or by pouring back and forth from one jar to another. After the cream has been stirred properly, the required amount of cream is then weighed out and placed in a test bottle. After the required amount has been weighed into the test bottle, the bottle with the cream is then placed in a water bath at 68° F. or colder and allowed to remain in this bath until the temperature of the cream is 68° F. This is necessary in order that the acid which is to be added shall not burn the test.

After the desired quantity of acid has been added, which acid is to be at 68° F., the bottle with its contents is then thoroughly mixed until all the curd has been dissolved and the sample is of a dark chocolate color. After this has been done, the test bottle is filled with hot soft water at 180° F. until the contents reach the bottom of the neck. The bottle is then placed in a tester and rotated the desired length of time and at the desired speed. After having been rotated as just stated for a certain length of time, the tester is stopped and enough water at 180° F. is added to bring the fat up to the graduated neck of the bottle and then the bottle is again whirled for a short time, usually about two minutes. After the bottle has been whirled a second time, it is taken out of the tester and placed for a short time in a water bath of 135° F. It is usually maintained in this bath for approximately ten minutes and sufficiently submerged to permit the water to surround the fat in the neck. After the bottle has remained ten minutes or possibly longer in this last bath, a reading may be taken.

The above description is a rough outline of the usual manner of making the test to determine the amount of butter fat in a given amount of cream. It has been customary in order to carry out this testing operation, to provide several tanks of water and to maintain the same at the desired temperature. However, it has been found that the water does not remain at the desired temperature in respect to the tanks and, consequently, each tank must have its contents brought back to the proper temperature before the contents can be used. This constant watching of the water to see that the same was at the proper temperature, occupied a large part of the operator's time and also had a tendency to lead to errors. In the present invention, a structure has been provided wherein a single testing tank structure is presented, designed to be heated by any suitable heater capable of easy regulation.

Referring to the accompanying drawing by numerals, 1 indicates the body of the tank which is provided with a jacket 2 for retarding radiation of heat. The jacket 2 along one, or if desired both sides, is provided with a number of air holes 3 to permit a certain amount of air circulation. The tank 1 is designed to be filled almost entirely full of water and maintained at a temperature of 180° F. by a suitable burner arranged beneath the tank. After the burner has been adjusted to constantly maintain the water in tank 1 at the desired temperature, no further attention need be given the apparatus but it may be used from time to time as desired and accurate results secured.

At one side of the tank 1 is arranged an auxiliary tank or compartment 3 which is filled or almost filled with water and which is maintained at a desired temperature by the heat from the water in tank 1. The water in the compartment or auxiliary tank 3 is usually maintained at 120° F. by the water in the tank 1 and this temperature of 120° F. in the water will readily warm the cream in the sample jar or jars 4 to 110° F. On the opposite side of the tank 1 to the compartment 3, is a second compartment 5 which is deeper than the compartment 3 and is adapted to receive one or more test bottles 6. The water in this section is maintained at 135° F. by the heat from the water in tank 1. It will be noted that a larger amount of wall space is exposed between the contents of the compartment 5 and the tank 1 than there is between tank 1 and the compartment 3 so that the temperature in compartment 5 is always higher than in compartment 3. The water in tank 1 may not only be used for maintaining the water in compartments 3 and 5 heated but for any other purpose desired. When one or more jars or bottles are inserted into either of the compartments 3 or 5, the overflow of water will pass out the respective pipes 7 and 8 and finally out through the discharge pipe 9. It will be understood that the usual method of testing is followed and that the invention refers only to the particular tank structure including central tank 1, compartments 3 and 5 and associated parts.

What I claim is:—

1. A cream testing tank, comprising a tank body adapted to contain hot water, and a pair of compartments connected therewith and arranged at different points thereon, one of said compartments being exposed to a greater degree of heat from the walls of said tank than the other whereby the contents thereof is maintained at a high temperature.

2. A cream testing tank, comprising a central tank body, a pair of auxiliary tanks or compartments heated from the central body, and a heating jacket for said central tank body provided with openings near the top.

3. A cream testing tank, comprising a tank body adapted to contain heated water, a comparatively shallow compartment arranged on one side of said tank body and formed so that the wall of the tank body will be one wall of the compartment, a second compartment arranged on the opposite side of said tank body constructed in a similar manner to the first mentioned compartment but with a greater amount of wall exposed whereby liquid deposited in said compartments will be maintained at different temperatures by the hot water in the tank body.

4. A cream testing tank, comprising a tank body adapted to contain hot water, a pair of compartments connected to the tank body and heated from the water in the tank body, and a drain pipe extending from near the top of each of said compartments for taking care of the overflow.

5. A cream testing tank, comprising a tank body adapted to contain hot water, a pair of compartments connected to the tank body and heated from the water in the tank body, said compartments having different amounts of wall space exposed to the water in the tank body whereby the temperature of the liquid in said compartments will be different, and a jacket surrounding said tank and spaced therefrom, said jacket extending below the bottom of the tank.

BRUCE DUANE CLEMENT.